United States Patent [19]
Wu

[11] Patent Number: 6,072,782
[45] Date of Patent: Jun. 6, 2000

[54] EFFICIENT ECHO CANCELLATION FOR DMT MDSL

[75] Inventor: Song Wu, Plano, Tex.

[73] Assignee: Texas Instruments Incorporated, Dallas, Tex.

[21] Appl. No.: 08/996,727

[22] Filed: Dec. 23, 1997

Related U.S. Application Data

[60] Provisional application No. 60/033,431, Dec. 23, 1996.

[51] Int. Cl.$^7$ ...................................................... H04B 3/20
[52] U.S. Cl. .......................... 370/286; 370/292; 375/229; 379/283
[58] Field of Search ..................................... 370/286, 276, 370/289, 468, 210, 282, 290, 292, 464, 465, 527, 480; 375/222, 229, 231, 232, 243, 230, 258, 260, 377; 379/398, 399, 402, 416, 283, 406, 410

[56] References Cited

U.S. PATENT DOCUMENTS

| | | | |
|---|---|---|---|
| 5,317,596 | 5/1994 | Ho et al. | 370/286 |
| 5,479,447 | 12/1995 | Chow et al. | 370/468 |
| 5,673,290 | 9/1997 | Cioffi | 370/210 |
| 5,754,592 | 5/1998 | Flowers et al. | 375/243 |
| 5,781,728 | 7/1998 | Rybicki et al. | 370/480 |
| 5,909,463 | 6/1999 | Johnson et al. | 370/276 |
| 5,910,970 | 6/1999 | Lu | 375/377 |

*Primary Examiner*—Dang Ton
*Assistant Examiner*—Phirin Sam
*Attorney, Agent, or Firm*—Warren L. Franz; Wade James Brady, III; Richard L. Donaldson

[57] ABSTRACT

An echo cancellation scheme for DMT MDSL digital subscriber loop telecommunications data transfer is disclosed. The echoed data stream frame is aligned with the incoming data stream frame. The time domain equalizer trims the lengths of both the DSL channel and echo channel within the length of the cyclic prefix, so that the time domain convolution for synthesizing the echo is accomplished within the FFT process, enabling the echo to be subtracted in the frequency domain.

10 Claims, 2 Drawing Sheets

EFFICIENT ECHO CANCELLATION FOR DMT MDSL

This application claims priority under 35 U.S.C. § 119 (e)(1) of provisional U.S. Ser. No. 60/033,431 filed Dec. 23, 1996, entitled "Efficient Echo Cancellation for DMT MDSL," the entirety of which is incorporated herein by reference.

This invention relates generally to digital subscriber loop (DSL) modem telecommunications systems and, more particularly, to echo cancellation methods employed in the same.

BACKGROUND OF THE INVENTION

Frequency division multiplexing and echo cancellation provide two schemes for full duplex MDSL implementation. Echo cancellation allows upstream and downstream signals sharing the same frequency band, therefore potentially offers higher data rate. However, it is well believed that the computational complexity prohibits the practical implementation of echo cancellation for discrete mulitone (DMT) signal transmission.

FIG. 1 shows a traditional echo cancellation system. At the DMT receiver, the incoming data $y_n$ mixes with the echoed transmission data $s_n$. This mixed data stream passes a common time domain equalizer (TEQ), and subtracts a synthesized echo stream after the TEQ. Since synthesizing an echo signal generally requires time domain convolution with a large number of taps, it is computationally expensive.

SUMMARY OF THE INVENTION

The invention provides a scheme for echo cancellation in a DMT telecommunications system which avoids the extensive echo synthesizing process of conventional systems.

As shown in FIG. 2, the echoed data stream frame is aligned with the incoming data stream frame and the time domain equalizer trims the lengths of both the DSL channel and echo channel within the length of the cyclic prefix, so that the process of time domain convolution for synthesizing echo can be accomplished within the fast fourier transform (FFT) process itself. The echo can therefore be subtracted in the frequency domain as shown in FIG. 2. The invention provides the schemes to align the echo frame with the data frame and optimize the TEQ to jointly shorten the impulse responses of DSL channel and echo channel.

BRIEF DESCRIPTION OF THE DRAWINGS

Embodiments of the invention have been chosen for purposes of illustration and description and are described with reference to the accompanying drawings, wherein.

DETAILED DESCRIPTION OF PREFERRED EMBODIMENTS

The echo frame alignment can be accomplished by estimating the echo delay and offsetting the transmitter timing.

The algorithm for echo delay estimation is similar to that of DMT frame synchronization and the time domain equalizer training. For easy discussion, the algorithm is re-elaborated here. The training sequence is implemented in the time domain. The basic unit is a block of random data $$\{\tilde{u}_n\},$$

Figure 1:
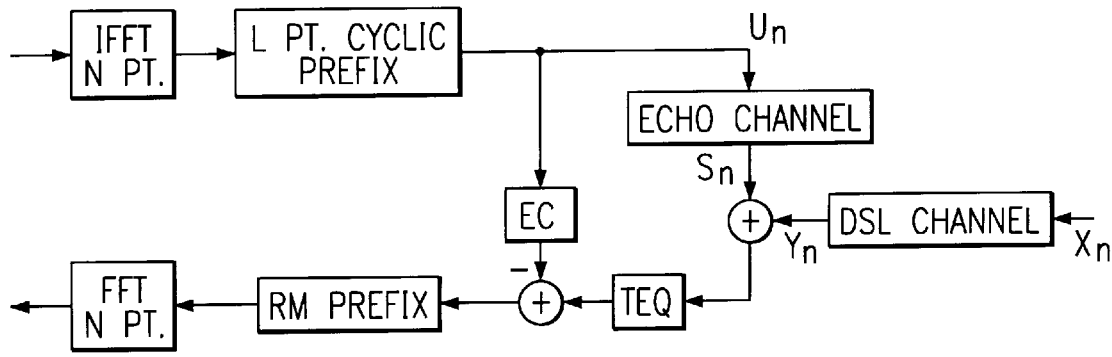
FIG. 1 is a block diagram of a conventional DMT echo canceller.
Figure 2:
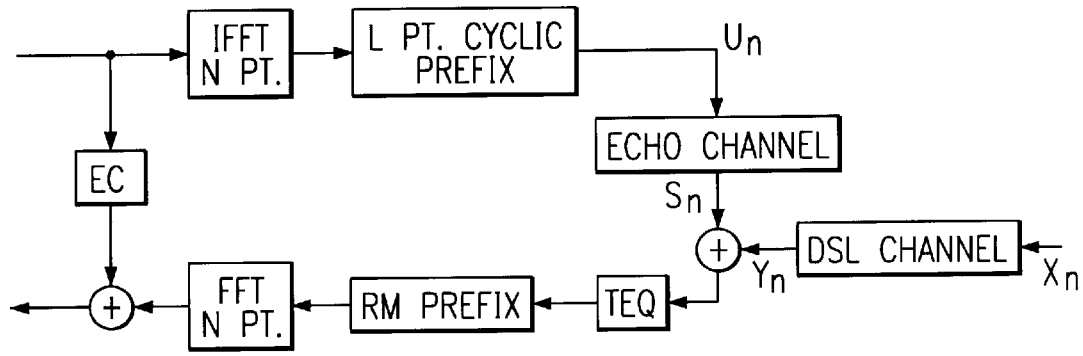
FIG. 2 is a block diagram listing DMT echo cancellation performed in the frequency domain in accordance with the invention.
Figure 3:
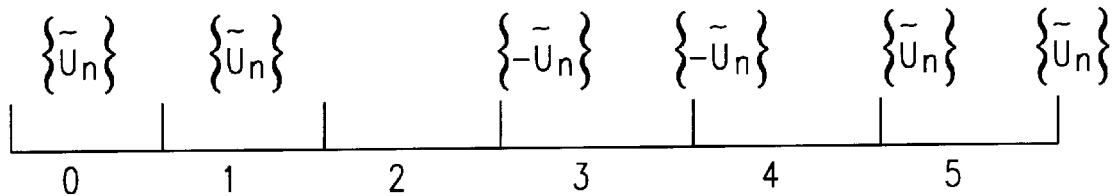
FIG. 3 shows the training sequence for echo delay estimation.

$-L \leq n < N$, where L is the prefix length and N is the length of FFT frame. The entire sequence is arranged in the way that random block $$\{\tilde{u}_n\}$$

repeats in time with the sign of data block alternating every two blocks as shown in FIG. 3. Assuming the combined channel impulse response is $e_k$, the received signal sequence corresponding to transmitted signal in FIG. 3 is:

$$1.\ v_1[n] = \sum_{k=0}^{n} \tilde{u}_{n-k} \cdot e_k + \sum_{k=1}^{\infty} \tilde{u}_{N-k} \cdot e_{n+k} + p_n \qquad (1)$$

$$2.\ v_2[n] = -\sum_{k=0}^{n} \tilde{u}_{n-k} \cdot e_k + \sum_{k=1}^{\infty} \tilde{u}_{N-k} \cdot e_{n+k} + p_n$$

$$3.\ v_3[n] = -\sum_{k=0}^{n} \tilde{u}_{n-k} \cdot e_k - \sum_{k=1}^{\infty} \tilde{u}_{N-k} \cdot e_{n+k} + p_n$$

$$4.\ v_4[n] = \sum_{k=0}^{n} \tilde{u}_{n-k} \cdot e_k - \sum_{k=1}^{\infty} \tilde{u}_{N-k} \cdot e_{n+k} + p_n$$

$$5.\ v_5[n] = v_1[n]$$

where, $p_n$ is the pilot tone superimposing on the training sequence. If the sequence v[n] is operated as v[n]−v[n−3·N], the data in the fourth frame is $$eco\_isi[n] = v_4[n] - v_1[n] = -2 \cdot \sum_{k=1}^{\infty} \tilde{u}_{N-k} \cdot e_{n+k}. \qquad (2)$$

It contains the information on intersymbol interference (igi) from the previous frame. The information on the length of channel impulse response is also embedded in this term. If the block of the training sequence is much longer than the channel impulse response, as $e_{n+k} \to 0$ when n increases, eco_isi[n] approaches zero when it closes to the end of frame 4. However, when data starts in the fifth frame, $$eco\_isi[n] = v_5[n] - v_2[n] = 2 \cdot \sum_{k=0}^{\infty} \tilde{u}_{n-k} \cdot e_k. \qquad (3)$$

Figure 4:
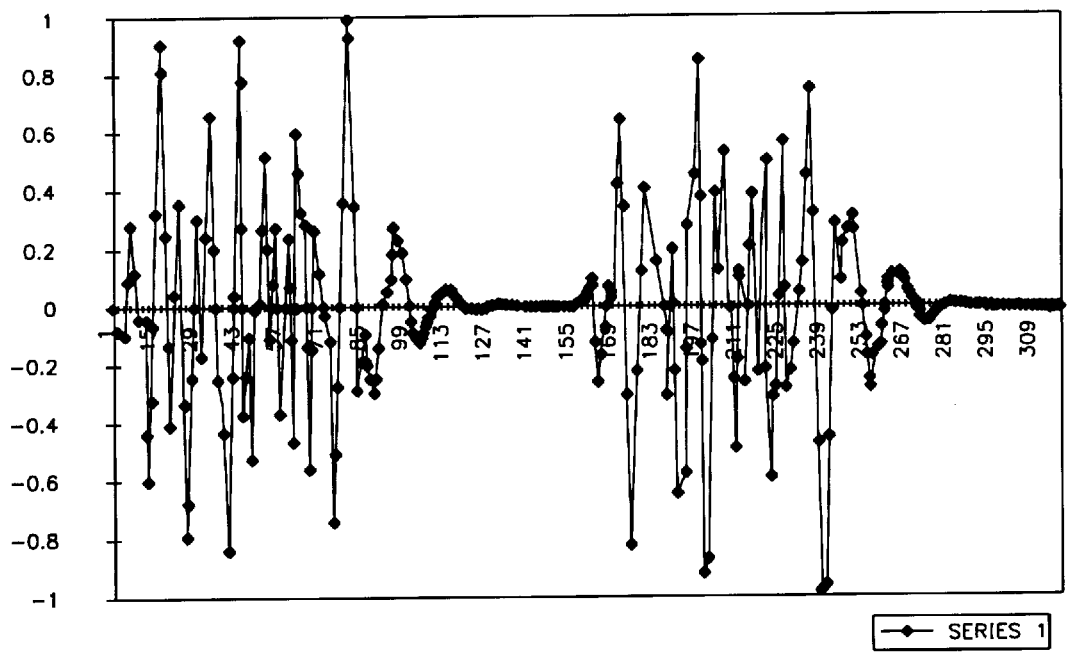
FIG. 4 shows the waveform of eco_isi[n].

The amplitude of eco_isi[n] starts to increase at frame boundary n=0. FIG. 4 shows the time sequence of eco_isi [n]. As shown in FIG. 4, the rising edge of the derived sequence eco_isi[n] can be used for echo delay estimation, and the trailing edge of eco_isi[n] can be used for time domain equalizer training.

By using the same technique, the data frame and channel ISI can be estimated. Assuming the training sequence for channel estimation is $\{\tilde{x}_n\}$, where $-L \leq n < N$, the data frame boundary can be obtained and the channel ISI is $$ch\_isi[n] = -2 \cdot \sum_{k=1}^{\infty} \tilde{x}_{N-k} \cdot h_{n+k}. \quad (4)$$

Once the echo frame and the data frame have been measured, the frame offset can be computed and subsequently used to adjust the transmitter timing so that the two frames can be aligned in time. The following discussion assumes that the echo frame and data frame have been aligned.

To minimize both the echo ISI and channel ISI, the time domain equalizer should be optimized such that $$err[n] = \alpha \cdot (ch\_isi[n])^2 + (1-\alpha) \cdot (eco\_isi[n])^2 = 0, \; n \geq 0 \quad (5)$$

where $\alpha$ is the weight factor. In the following discussion, the taps for time domain equalizer (TEQ) are $w_l$, the echo signals before and after TEQ are $s_n$ and $q_n$ respectively, and the data signals before and after TEQ are $y_n$ and $z_n$ respectively. Since the signals have the relationship $$q_n = \sum_k w_k \cdot s_{n-k} \quad (6)$$

and $$z_n = \sum_k w_k \cdot y_{n-k}, \quad (7)$$

the echo and channel ISIs can also be expressed as $$eco\_isi[n] = \sum_k (s_4[n-k] - s_1[n-k]) \cdot w_k \quad (8)$$

and $$ch\_isi[n] = \sum_k (y_4[n-k] - y_1[n-k]) \cdot w_k. \quad (9)$$

By using the gradient search LMS algorithm and $$\frac{\partial}{\partial w_k} err[n] = 2\alpha \cdot (y_4[n-k] - y_1[n-k]) \cdot ch\_isi[n] + \quad (10)$$
$$2(1-\alpha) \cdot (s_4[n-k] - s_1[n-k]) \cdot eco\_isi[n]$$

the TEQ coefficients can be updated as $$w_k^{l+1} = w_k^l + 2 \cdot \mu \cdot [\alpha \cdot (y_4[n-k] - y_1[n-k]) \cdot ch\_isi[n] + (1-\alpha) \cdot (s_4[n-k] - s_1[n-k]) \cdot eco\_isi]^l \quad (11)$$

where $\mu$ is the step size. In equation (11), since both ch_isi[n] and eco_isi[n] have to be estimated independently, in practical implementation one may use time division multiplex techniques to estimate the channel ISI and echo ISI separately.

Once the echo frame is aligned with the data frame, and the TEQ is optimized for both echo and data channels, the echo cancellation can be done in the frequency domain as $$X_k = W_k \cdot Z_k - E_k \cdot U_k, \quad (12)$$

where $W_k$ is a tap of frequency domain equalizer, $Z_k$ is the received echo and data signals transformed into frequency domain, $E_k$ is a tap of frequency domain echo canceller, and $U_k$ is the transmitted signal.

Asymmetric echo cancellation

For full duplex modem system, the echo frame alignment can only be done at one end of a modem pair because of loop timing. Because the remote modem receiver runs at a higher data rate than the remote modem transmitter, it is efficient to perform the frequency domain echo cancellation at the remote end. Assuming the downstream signal is K times wider than the upstream signal, then the sample rate at the remote modem receiver is K times that of transmitter. Consequently, at the remote modem receiver the echo signal is K times up-sampled comparing with transmission signal, i.e., $$\tilde{u}_{l \cdot K + k} = u_{l \cdot K}, \; 0 \leq k < K. \quad (13)$$

Also since N points FFT on $\tilde{u}$ $$FFT(\tilde{u}, N) = \sum_{l=0, k=0}^{l=N/K-1, k=K-1} \tilde{u}_{l \cdot K + k} \cdot e^{-2\pi j l \cdot K + \frac{k}{N}} \quad (14)$$

$$= \sum_{l=0}^{N/K-1} u_{l \cdot K} \cdot e^{-2\pi j \frac{l}{N/K}} \cdot \sum_{k=0}^{K-1} e^{-2\pi j \frac{k}{N}}$$

$$= FFT(u, N/K) \cdot \sum_{k=0}^{K-1} e^{-2\pi j \frac{k}{N}}$$

has only N/K non-zero components, thus in the frequency domain the echo exists only for a few tones.

At the central office side, since the sample rate of the receiver is only a fraction of the transmission bandwidth, the echo signal is decimated in time and causes aliasing. In the time domain, the decimated echo signal is represented as $$q_n = \sum_{l,k} e_{l \cdot K + k} \cdot \tilde{u}_{n \cdot K - (l \cdot K + k)}. \quad (15)$$

Figure 5:
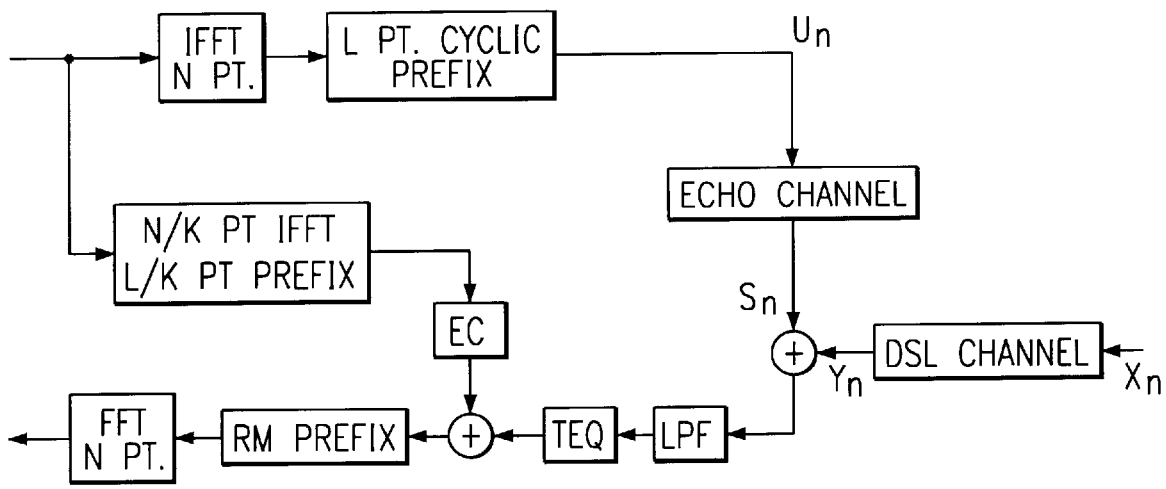
FIG. 5 is a block diagram showing the inventive echo cancellation at the central office.

Although the number of taps for echo cancellation is still large, the number of operations per second is low since the samples have been decimated. Also, if a low pass filter is placed in front of the central office receiver such that frequency response of the echo channel satisfies $$\tilde{E}_n = \begin{cases} E_n, & 0 \leq n < N/K \\ 0, & N/K \leq n \end{cases} \quad (16)$$

the number of taps can be further reduced, and the convolution operation is simplified to $$q_n = \sum_l e_{l \cdot K} \cdot \hat{u}_{n-l} \quad (17)$$

where $\hat{u}$ is the fourier transform of first N/K samples of $U_k$. The block diagram of echo cancellation at the central office is shown in FIG. 5.

Those skilled in the art to which the invention relates will appreciate that various substitutions and modifications may be made to the foregoing embodiments, without departing from the spirit and scope of the invention as defined in the claims.

What is claimed is:

1. An echo cancellation method for a DMT digital subscriber loop modem telecommunications system using N-sample length FFT and L-sample length cyclic prefix framing, wherein incoming data signal samples $y_n$ from a DSL channel are mixed with echo signal samples $s_n$ from an echo channel of transmitted data signal samples $u_n$ from a transmitter, and the mixed data stream of incoming data signal samples and echo signal samples is passed in a combined channel through a time domain equalizer to a fast Fourier transform time domain-to-frequency domain transformer, the method comprising:

aligning frames of the echo signal samples with frames of the incoming data signal samples in the combined channel prior to passing the mixed data stream through the time domain equalizer;

adapting the time domain equalizer to jointly shorten the combined impulse responses for both incoming data signal and echo signal intersymbol interference; and performing echo cancellation in the frequency domain within the fast Fourier transform, as $$X_k = W_k \cdot Z_k - E_k \cdot U_k,$$

where $W_k$ is a tap of a frequency domain equalizer, $Z_k$ is the received mixed echo and incoming data signal samples transformed into frequency domain, $E_k$ is a tap of a frequency domain echo canceler, and $U_k$ is the transmitted signal;

the frames being aligned by estimating an echo delay and offsetting transmitter timing to compensate for the delay, with alignment being done using a training sequence implemented in time domain using a block of random data $$\{\tilde{u}_n\},$$

$-L \leq n < N$, in a sequence arranged so that the random block repeats in time with the sign of the data block alternating every two blocks; and, for a combined channel impulse response $e_k$, the received signal corresponding to the transmitted signal is, $$v_1[n] = \sum_{k=0}^{n} \tilde{u}_{n-k} \cdot e_k + \sum_{k=1}^{\infty} \tilde{u}_{N-k} \cdot e_{n+k} + p_n;$$

$$v_2[n] = -\sum_{k=0}^{n} \tilde{u}_{n-k} \cdot e_k + \sum_{k=1}^{\infty} \tilde{u}_{N-k} \cdot e_{n+k} + p_n;$$

$$v_3[n] = -\sum_{k=0}^{n} \tilde{u}_{n-k} \cdot e_k - \sum_{k=1}^{\infty} \tilde{u}_{N-k} \cdot e_{n+k} + p_n;$$

$$v_4[n] = \sum_{k=0}^{n} \tilde{u}_{n-k} \cdot e_k - \sum_{k=1}^{\infty} \tilde{u}_{N-k} \cdot e_{n+k} + p_n; \text{ and}$$

$$v_5[n] = v_1[n];$$

where $p_n$ is a pilot tone superimposed on the training sequence.

2. A method as in claim 1, wherein a rising edge of a derived sequence $$eco\_isi[n] = v_4[n] - v_1[n] = -2 \cdot \sum_{k=1}^{\infty} \tilde{u}_{N-k} \cdot e_{n+k}$$

is used for echo delay estimation.

3. A method as in claim 2, wherein a trailing edge of the derived sequence is used for time domain equalizer training.

4. A method as in claim 1, wherein an edge of a derived sequence $$eco\_isi[n] = v_4[n] - v_1[n] = -2 \cdot \sum_{k=1}^{\infty} \tilde{u}_{N-k} \cdot e_{n+k}$$

is used for time domain equalizer training.

5. A method as in claim 3, wherein a training sequence for DSL channel estimation is implemented in time domain using a block of random data $$\{\tilde{x}_n\},$$

$-L \leq n < N$, to obtain a boundary for the incoming data signal frames, and DSL channel intersymbol interference is given by $$ch\_isi[n] = -2 \cdot \sum_{k=1}^{\infty} \tilde{x}_{N-k} \cdot h_{n+k}.$$

6. A method as in claim 5, wherein the time domain equalizer is optimized such that $$err[n] = \alpha \cdot (ch\_isi[n])^2 + (1-\alpha) \cdot (eco\_isi[n])^2 = 0, \; n \geq 0,$$

where $\alpha$ is a weight factor.

7. A method as in claim 6, wherein the taps for the time domain equalizer are $w_l$, the echo signals before and after the time domain equalizer are $s_n$ and $q_n$ respectively, the data signals before and after the time domain equalizer are $y_n$ and $z_n$ respectively; the signals have the relationships $$q_n = \sum_k w_k \cdot s_{n-k}$$

and $$z_n = \sum_k w_k \cdot y_{n-k},$$

and wherein time domain equalizer coefficients are updated as $$w_k^{l+1} = w_k^l \cdot 2 \cdot \mu \cdot [\alpha \cdot (y_4[n-k] - y_1[n-k]) \cdot ch\_isi[n] + (1-\alpha) \cdot (s_4[n-k] - s_1[n-k]) \cdot eco\_isi]'$$

wherein $\mu$ step size.

8. A method as in claim 1, for a full duplex modem system with loop timing, wherein frame alignment is done at only one end of a remote modem-central office modem pair.

9. A method as in claim 8, wherein the echo cancellation is done at the remote modem end.

10. A method as in claim 9 for asymmetric telecommunications operation, wherein a sample rate for a downstream signal at the remote end is K times that of a transmitted upstream signal; a low pass filter is placed in front of a receiver of the central office modem, such that frequency response of the echo channel satisfies $$\tilde{E}_n = \begin{cases} E_n, & 0 \le n < N/K \\ 0, & N/K \le n \end{cases}$$

and an applied convolution operation is $$q_n = \sum_l e_{l \cdot K} \cdot \hat{u}_{n-l}$$

where $\hat{u}$ is a fourier transform of a first N/K samples of $U_k$.

* * * * *